United States Patent [19]
Guichard et al.

[11] Patent Number: 5,170,427
[45] Date of Patent: Dec. 8, 1992

[54] AUDIO AND VIDEO COMMUNICATIONS TERMINAL WITH IMPROVED ADJUSTMENTS

[75] Inventors: Jacques Guichard; Georges Buchner, both of Paris; Alain Isckia, Choisy le Roi, all of France

[73] Assignee: Etat Francais, France

[21] Appl. No.: 473,878

[22] Filed: Feb. 2, 1990

[30] Foreign Application Priority Data

Feb. 3, 1989 [FR] France .................. 89 01408

[51] Int. Cl.$^5$ .................. H04N 7/12; H04N 7/14
[52] U.S. Cl. .................. 379/53; 358/85
[58] Field of Search .................. 379/53; 358/85

[56] References Cited

U.S. PATENT DOCUMENTS

| | | | |
|---|---|---|---|
| 4,485,400 | 11/1984 | Lemelson et al. | 358/85 |
| 4,891,837 | 1/1990 | Walker et al. | 379/390 |
| 5,008,924 | 4/1991 | Guichard et al. | 358/85 |

FOREIGN PATENT DOCUMENTS

| | | |
|---|---|---|
| 3600914 | 7/1987 | Fed. Rep. of Germany . |
| 0105988 | 5/1986 | Japan . |
| 0198891 | 9/1986 | Japan . |
| 0114485 | 5/1988 | Japan . |
| 0180283 | 7/1988 | Japan . |
| 0197188 | 8/1988 | Japan . |
| 0243791 | 9/1989 | Japan . |
| 0258576 | 10/1989 | Japan . |
| 0277083 | 11/1989 | Japan . |
| 0022985 | 1/1990 | Japan . |

OTHER PUBLICATIONS

I.E.E.E. Journal on Selected Areas in Communications, vol. SAC-4, No. 4, Jul. 1986, pp. 625-632, M. Tasto, "Terminals for Broad-Band Office Communications". Review of the Electrical Communications Laboratories, vol. 36, No. 2, Mar. 1988, pp. 233-237 G. Suzuki "Small Screen Video Communication Terminal".

*Primary Examiner*—James L. Dwyer
*Assistant Examiner*—Stella L. Woo
*Attorney, Agent, or Firm*—Blakely, Sokoloff, Taylor & Zafman

[57] ABSTRACT

An audio and video communications terminal, of the type comprising a housing, a camera provided with an optical system, a display screen, a microphone, a loudspeaker, and a central unit including a sound and image information encoder and decoder, and an interface in association with the elements for communication with another terminal of the same type via a digital transmission network, the terminal further comprising electric motors and clutches for adjusting at least one camera parameter; a manual control suitable for generating control information for adjusting the parameter(s); and a switch for switching between a local adjustment mode in which the control information is applied to the electric motors and clutches, and a remote adjustment mode in which the control information is sent to the other terminal over the digital network in parallel with the sound and image information, and in which control information received from the other terminal, likewise over the digital network and in parallel with sound and image information, is applied to the electric motors and clutches. The invention is applicable to improving user comfort with video telephones.

11 Claims, 5 Drawing Sheets

FIG_1

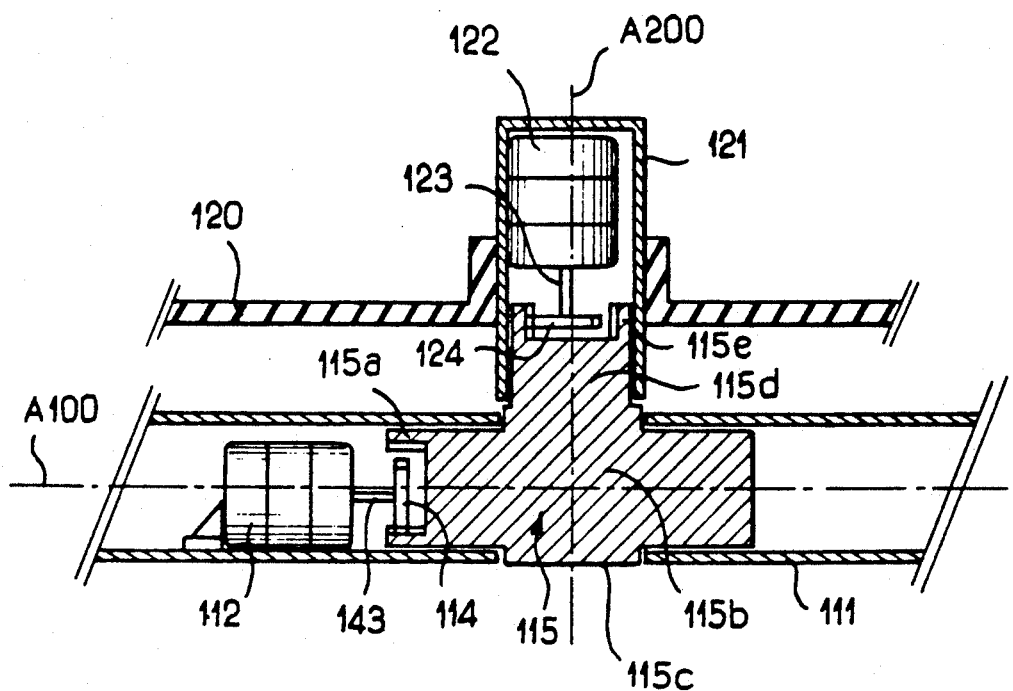
FIG_3
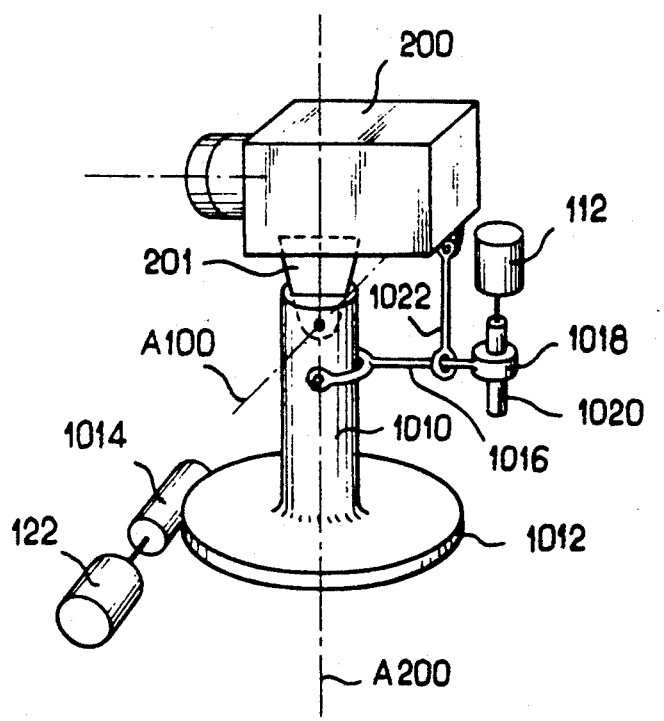
FIG_4

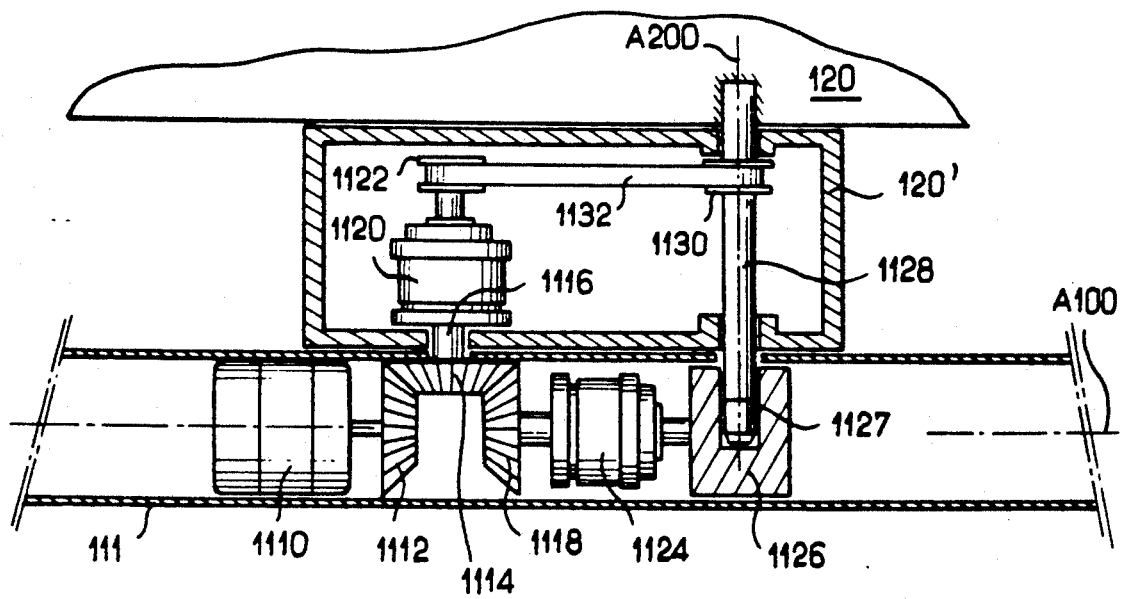
FIG_5
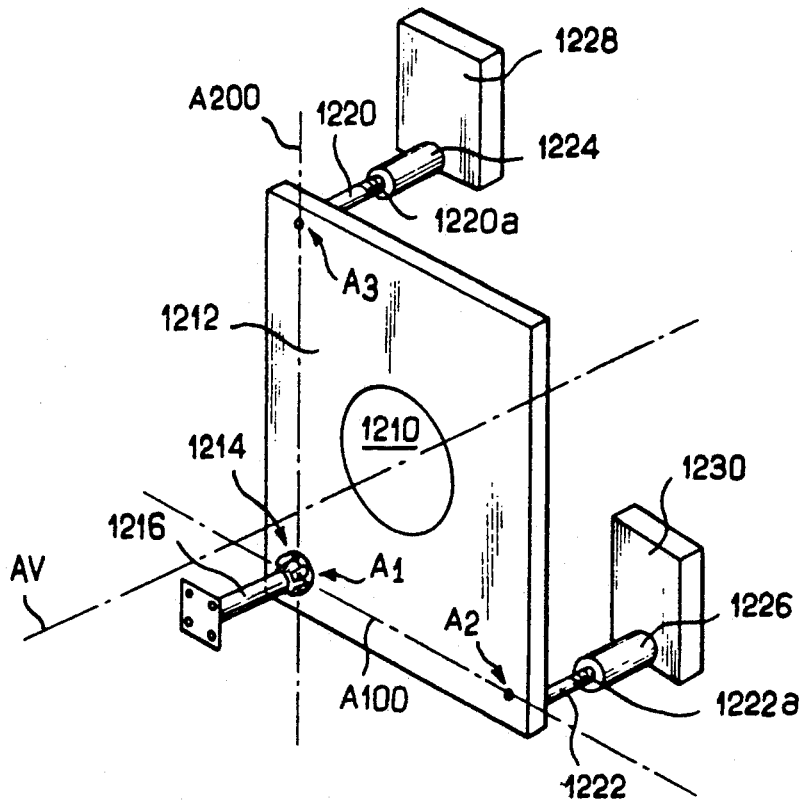
FIG_6

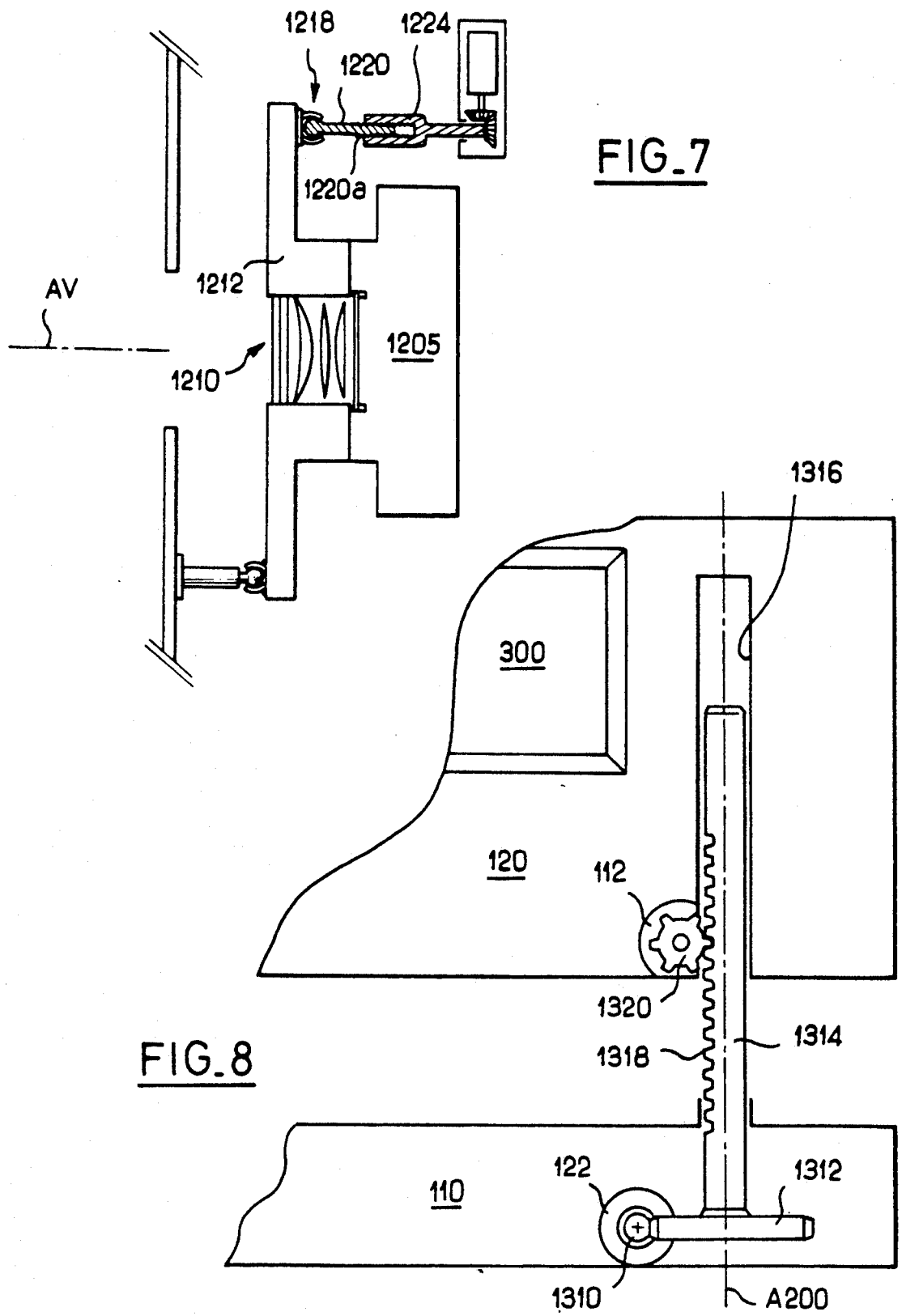

AUDIO AND VIDEO COMMUNICATIONS TERMINAL WITH IMPROVED ADJUSTMENTS

The present invention relates in general to videotelephony, and more particularly in relates to improvements provided to audio and video communications terminals such as video telephones for the purpose of providing greater user comfort.

BACKGROUND OF THE INVENTION

In known audio and video communications terminals, the aiming direction of the camera is generally fixed. This means that in order to enable the subject to move to some extent in the field of the camera without the distant party losing the image of the subject, the viewing angle of the camera (as determined by the focal length of its objective lens) must be relatively large. This means that the screen of the distant videophone consequently reproduces an image in which the subject occupies a relatively small amount of space. In other words the subject is seen in a "long shot". This phenomenon is made worse by the fact that the screens of video telephones are generally small in size.

Simultaneously, studies have shown that users find a video telephone advantageous only if the distant party is seen in "close-up", i.e. with a smaller viewing angle and thus a longer focal length. This requirement therefore raises the difficulty that the slightest movement of the observed subject is likely to cause the subject to move out of the field of the camera, at least in part. In this respect, it may be observed that means for giving assistance in positioning, as described in U.S. Pat. No. 3,544,715, for example, turn out to be unusable in practice since they require too high an effort of concentration on the part of the user. More precisely, although these devices are capable of operating satisfactorily technically speaking, they are unsatisfactory ergonomically speaking.

Thus, the state of the art teaches no practical solution enabling a distant party to be observed in close-up while still allowing that party to move relatively freely relative to the terminal. Simultaneously, it appears that these two contradictory requirements are going to be fundamental if the video telephone is to be a success on a large scale.

The present invention therefore seeks to remedy the limitations of the proir art by providing a video telephone type of terminal in which the distant party can be observed in close-up without requiring that party to occupy an extremely fixed position in front of the camera in his or her own terminal.

More generally, the object of the present invention is to provide a terminal in which the party using the terminal is not subjected without any possibility of intervention, to comfort-reducing degradation in the quality of the image (and optionally sound) information received by that terminal.

SUMMARY OF THE INVENTION

The present invention thus provides an audio and video communications terminal, of the type comprising a housing, a camera provided with an optical system, a display screen, a microphone, a loudspeaker, and a central unit including sound and image information encoding and decoding means, and interface means in association with said elements for communication with another terminal of the same type via a digital transmission network, the terminal further comprising, in combination:

adjustment means for adjusting at least one camera parameter;

manual control means suitable for generating control information for adjusting said parameter(s); and switching means for switching between a local adjustment mode in which said control information is applied to said adjustment means, and a remote adjustment mode in which said control information is sent to said other terminal over the digital network in parallel with said sound and image information, and in which control information received from said onter terminal, likewise over the digital network and in parallel with sound and image information, is applied to said adjustment means.

An essential advantage of the invention lies in that one or more parameters can thus be adjusted in real time from one or other of the inter-communicating terminals, as selected by the users.

A terminal of the invention preferably includes the following optional features:

while a call is being set up, the switching means are in local mode;

the switchovers of the switching means from one mode to the other are controlled by the central unit;

means for generating an authorization signal for authorizing switchover to remote mode, and the central unit includes means for switching over the switching means to remote mode only after such authorization has been both generated in the terminal itself and received from another terminal;

the central unit includes means for recognizing a code received from another terminal and for switching over said switching means to remote mode when said received code is recognized;

the adjustment means include motorized drive means for changing the aiming direction of the camera;

the drive means vary the elevation and the bearing of the camera aiming direction;

when the housing of the terminal includes a fixed portion and a moving portion housing the camera and articulated to the fixed portion about a horizontal axis said drive means act on the portion of the housing which houses the camera;

the drive means are likewise suitable for pivoting said portion of the housing which houses the camera about an axis perpendicular simultaneously to the hinge axis and to the aiming axis of the camera;

the drive means vary the height of the camera and the bearing direction of its aiming axis;

the drive means either comprise two electric motor capable of being controlled individually, or else one electric motor and two clutches connected to the motor;

the drive means comprise a support for the camera optics, the support including three bearing points disposed in a right angle triangle, the point situated at the right angle of the triangle being constituted by a ball link, and motorized means for varying the positions of the other two bearing points in directions essentially perpendicular to the plane of the triangle;

the camera parameter(s) are selected from the group comprising: the aiming direction of the camera and/or its optical system; focal length of the optical system; aperture of the optical system; and camera color parameters;

if the terminal further includes a source of light for illuminating the subject, the adjustment means may act on the intensity of the source, which thus constitutes one of the camera parameters;

the adjustment means are also suitable for acting on sound transmission parameters;

in remote adjustment mode, adjustment information is conveyed over the digital network in the form of digital words incorporated in predetermined time intervals in the "contol and flag" section of a standard digital transmission frame; and when the microphone and the loudspeaker are incorporated in a handset, the manual control means may include at least one control button provided on the handset.

BRIEF DESCRIPTION OF THE DRAWINGS

Embodiments of the invention are described by way of example with reference to the accompanying drawings, in which:

FIG. 3 is a detailed vertical section through a portion of a terminal in accordance with a first embodiment of the present invention;

FIG. 4 is a diagrammatic prespective view of a portion of a terminal in accordance with a different embodiment of the present invention;

FIG. 5 is a detailed vertical section view through a portion of a terminal constituting yet another portion of the present invention;

FIG. 6 is a diagrammatic perspective view of a portion of a terminal in accordance with yet another embodiment of the present invention;

FIG. 7 is a side view, partially in section, of the portion shown in FIG. 6; and FIG. 8 is a front view, partially in section, of a portion of a terminal in accordance with yet another embodiment of the present invention.

DETAILED DESCRIPTION

Figure 1:
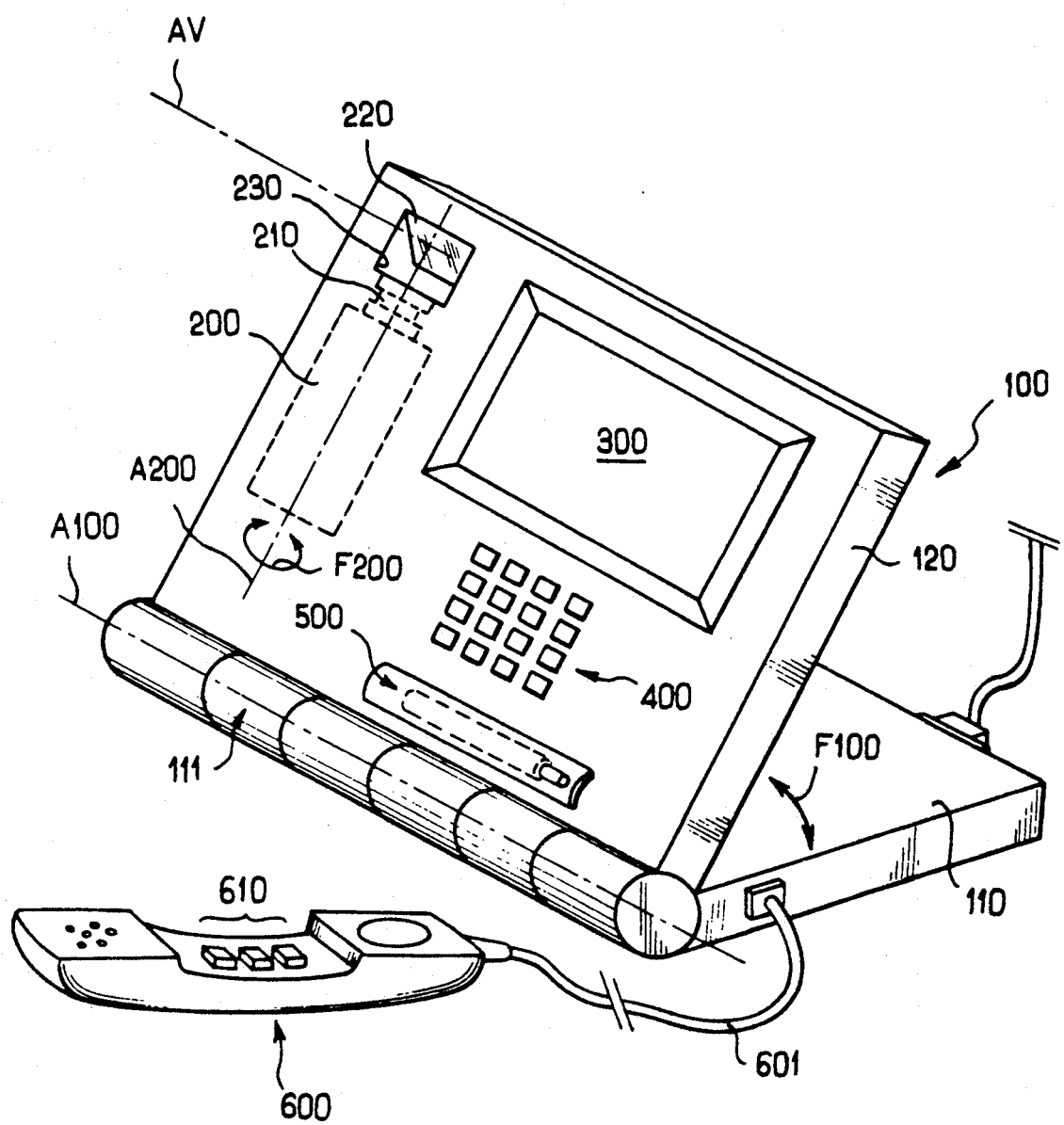
FIG. 1 is a diagrammatic perspective view of a video telephone type terminal to which the invention may be applied.

Reference is made initially to FIG. 1 which shows a video telephone type terminal suitable for communicating with other terminals of the same nature via a low data rate digital transmission network.

The terminal comprises firstly a housing 100 comprising two portions 110 and 120 which are hinged to each other. The portion 110 is intended to rest horizontally on a plane support, while the portion 120 is displaceable and is suitable for being stood up, as shown, in order to take up an angle of inclination relative to the horizontal, which angle is slectable within determined limits.

The portions 110 and 120 are hinged to each other about a horizontal axis A100 embodied by a shaft 111 including portions capable of rotating relative to one another and fixed to respective ones of said two portions 110 and 120.

An electric drive motor (not shown in FIG. 1) serves to vary the angle of inclination of housing portion 120 relative to its portion 110 (arrow F100), by means of a suitable transmission.

The top portion 120 of the housing houses a camera 200, a display screen 300, a keypad 400, and additional lighting means 500.

The terminal also includes a handset 600 connected to the housing by a cable 601 and conventionally housing a microphone and a loudspeaker (not shown). The handset also includes a set of control buttons 610 which are suitable for transmitting control information to the terminal over the cable 601, e.g. as described in Frech patent application number 88 10003, filed Jul. 25, 1988.

The camera 200 preferably includes a solid-state sensor (a charge coupled device of CCD) and in the present case it is disposed flat in the portion 120 of the housing, with its objective lens 210 pointing upwards. A mirror 220 disposed at 45° looking through a window 230 formed in the portion 120 of the housing serves to direct an image received from in front of the terminal towards the objective lens. The optical axis along which the camera aims is referenced AV.

In addition, in association with the camera, the terminal includes a second electric motor (not shown) suitable for driving the camera, together with the objective lens 210 and the mirror 220, in the direction of arrow F200 about an axis A200 which extends along the axis of the lens, i.e. which lies in the plane of housing portion 120 and which extends perpendicularly to the hinge axis A100 and to the aiming axis AV.

It will be understood that by appropriately controlling the two above-mentioned electric motors, the aiming direction of the camera 200 can be varied both in elevation and in bearing. More precisely, by changing the inclination between the portions 110 and 120 of the housing, the axis AV may be inclined as desired both up and down (change of elevation angle), whereas by rotating the camera 200 and its picture-taking accessories 210, 220 about the axis A200 (arrow F200), the sideways aiming direction is changed (change in bearing angle).

It should be observed that the terminal shown in FIG. 1 is given purely by way of example. This the present invention also applies to terminals of completely different types, as explained below.

Figure 2:
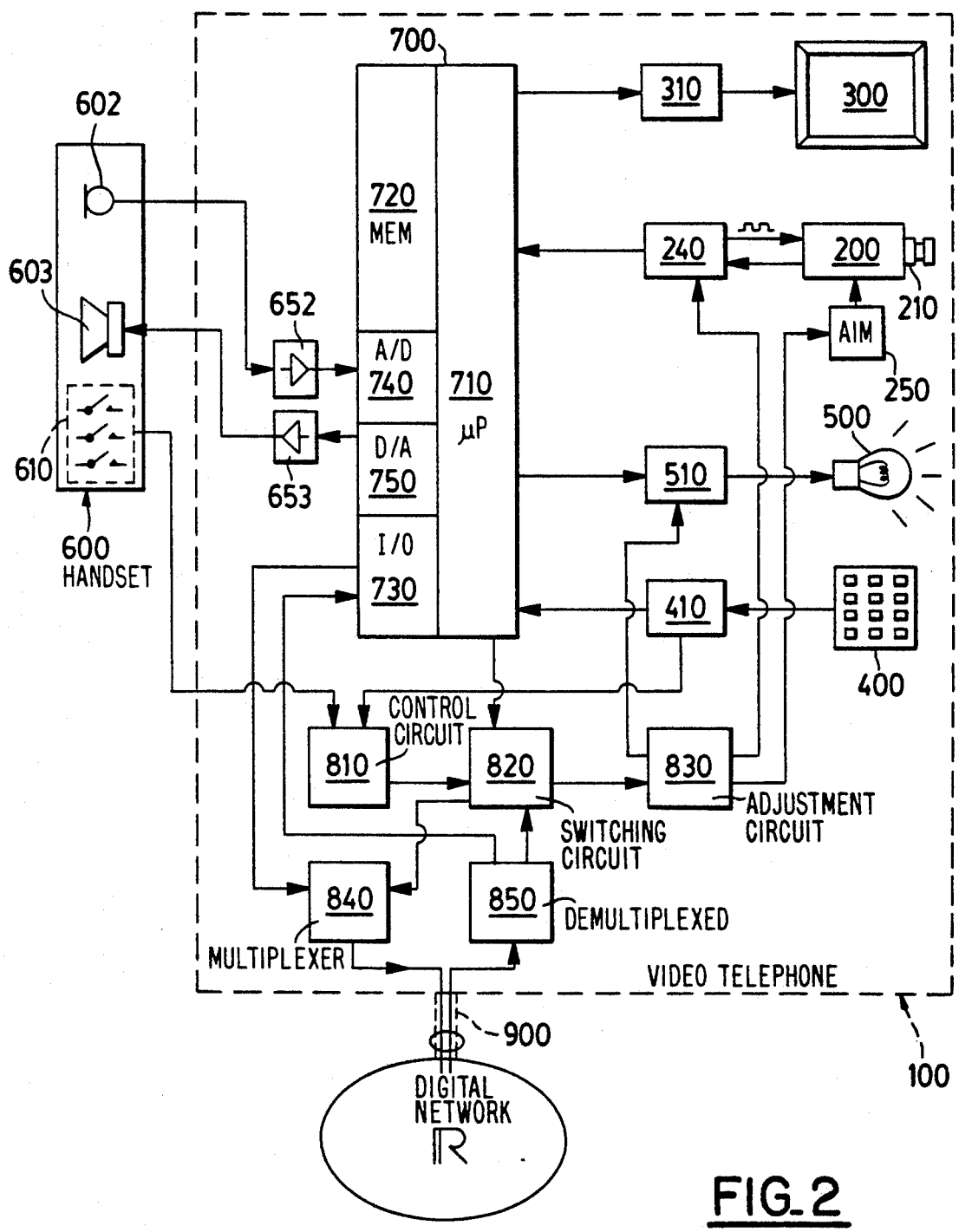
FIG. 2 is a block diagram of the internal architecture of the FIG. 1 video telephone.

FIG. 2 is a block diagram of the internal structure of the FIG. 1 terminal. In FIG. 2, and in all the other figures, items or portions which are identical or similar to those shown in FIG. 1 are designated by the same reference numerals and, as a general rule, they are not described again.

The terminal includes a central processor unit 700 comprising a processor 710, a memory 720 and an input/output (I/O) interface 730 itself connected to a cable 900 for connecting the terminal to other terminals of the same type via a low data rate digital network, referenced R.

The central unit 700 is connected the the camera 200 via an appropriate interface and control circuit 240, and is suitable for storing the images provided by the camera at a determined rate in encoded digital form (e.g. using image compression encoding techniques, etc. ....).

The sereen 300 which may be a liquid crystal screen, for example, is controlled by an appropriate control circuit 310 which receives digital image information from the central unit.

The keypad 400 is connected to a keypad decoder circuit 410 having one of its outputs connected to the central unit 700.

The brightness of the light source 500 for illuminating the subject observed by the camera 200 is under the control of an appropriate circuit 510 which receives instructions from the central unit 700. These instructions may be determined, for example, by analyzing the luminance of the image picked up by the camera.

Finally, the microphone 602 and the loudspeaker 603 are connected to the central unit 700 via respective amplifier and filter circuits 652 and 653, and via respective converters, namely an analog-to-digital converter 740 for the microphone and a digital-to-analog converter 750 for the loudspeaker.

The terminal described above operates in conventional manner. When a video telephone call is set up with a distant terminal of the same nature, the images picked up by the camera 200 are digitized and encoded, as are the sounds picked up by the microphone 602, and the corresponding data is transmitted in real time over the network to the other terminal using an appropriate data interchange protocol. The connection established over the network R is is both-way, and simultaneously digital image and sound information received from the other terminal is reproduced on the screen 300 and by the loudspeaker 603 after appropriate decoding and conversion.

In accordance with a first essential aspect of the invention, the terminal includes means for adjusting certain parameters relating to the sound and/or the image transmitted to the network.

As shown diagrammatically in FIG. 2, an adjustment unit 830 is provided for sending adjustment signals to the various components of the terminal. Firstly, the unit 830 sends signals to a motorized drive unit 250 which is mechanically associated with the camera 200 and which serves to change its aiming direction. Preferably, and as mentioned above with reference to FIG. 1, the motorization unit 250 is capable of changing the aiming direction of the camera both in elevation and in bearing, as described in greater detail below.

Optionally, the adjustment unit 830 may also control the focusing, aperture, and the focal length of the camera lens, by means of other suitable motors (not shown).

It may also be observed that the adjustment unit 830 is connected to the electronic circuit 240 of the camera. It is thus possible to adjust other parameters relating to the image formed, in particular color parameters.

Finally, in the present example, the adjustment unit 830 is capable of sending instructions to the circuit 510 for controlling the brightness of the additional illumination, for the purpose of changing said brightness.

In FIG. 2, it can be seen that the adjustment circuit 830 is associated with a control circuit 810 and with a switching circuit 820, and also with a multiplexer 840 and a demultiplexer 850 interposed respectively in the digital signal outlet and inlet lines connected to the network R.

The control unit 810 is also connected to a second output from the circuit 410 for decoding the keypad 400, as well as being connected to the control buttons 610 provided in the handset 600 of the terminal. More precisely, the handset control buttons 610 and some of the keys in the keypad 400 are intended to control various ones of the above-mentioned adjustments, and control signals corresponding to their respective actions are generated by the control unit 810 and are suitable for being applied to the adjustment unit 830 in order to perform the above-mentioned adjustments, in local mode.

In accordance with another aspect of the present invention, the switching circuit 820 is interposed between the control circuit 810 and the adjustment circuit 830. Under the control of a specific instruction delivered by the central unit 700, the switching circuit is suitable for taking up one or other of two states.

In a first state, corresponding to the above-mentioned "local" mode, instructions delivered by the circuit 810 are applied to the adjustment circuit 830. As a result, the user of a terminal can control the adjustment functions available at the terminal. For example, the buttons 610 provided on the handset 600 enable the user to adjust the aiming direction of the camera 200 by means of the motorized unit 250 in order to adapt the camera to the user's current position, without requiring the user to move in order to perform the adjustment.

In order to assist the user in performing such adjustment, means may be provided in the terminal such that under the action of some other handset button 610, they cause the image picked up by the camera 200 to be applied temporarily to the screen 300. During this short self-observation period, which is triggered at the user's request, the user can adjust the aiming direction of the camera as mentioned above in order to ensure that the user is properly framed.

In a second state of the switching circuit 820, corresponding to a "remote" or "cross" mode of adjustment, the switch 820 applies the control information from the circuit 810 to the data output line via the multiplexer circuit 840 in order to enable it to be received by the remote terminal. This transmission over the network of control information takes place in parallel with the transmission of image and sound information, and without interfering therewith.

Simultaneously, the switching circuit applies control information from the demultiplexer 850 to the adjustment circuit 830. This information comes from the distant terminal over the network R and is intended for the local terminal in exactly the same way as the local terminal sends control information intended for the distant terminal likewise over the network. The demultiplexer 850 serves to extract the digital control information from the digital signal received by the local terminal.

Thus, when the switch 820 is in the second state, each party can act remotely and at least approximately in real time on the image and/or sound adjustment(s) of the remote terminal.

This thus leads to the situation which is particularly advantageous ergonomically speaking, whereby each person observing an image is capable of controlling the framing, focusing, zoom, etc. of the camera which is picking up the image being observed, i.e. of the remote camera.

Although FIG. 2 shows the use of multiplexing for combining digital image and sound information with remote control information that transits between the two terminals, this is naturally merely by way of example and the information could be transmitted by some other means.

For example, the switching circuit could be designed to place the information in the random access memory 720 of the central unit together with the image and sound information currently being sent. More precisely, when two terminals are in communication by means of standardized frames, and in particular by means of the H221 frame laid down by the International Telegraph and Telephone Consultative Committee (CCITT), it is particularly advantageous for remote control signals intended for the remote terminal to be incorporated in the service channel of such a frame.

Naturally, the various circuits are designed so that the remote control signals are transmitted in such a manner as to occupy as small a volume as possible, with particular account being taken of the fact that when transmitting images over a low data rate digital network, one is generally operating at the capacity limit of the transmission system.

For example, incremental/decremental coding may be used for this type of information, i.e. for each parameter capable of being remotely modified, only three possible states are sent (increment, decrement, leave unchanged), with this information being decoded at the receiving terminal in order to control possible changes in one or more of the current adjustment values.

Further, it is not absolutely essential that a remote control instruction from one terminal should be responded to instantly at the remote terminal. For example, the remote control information may be transmitted at a rate which is lower than the frame transmission rate, e.g. 2 to 20 times per second. In practice, the reaction delay at the remote terminal will very often be imperceptible to the parties.

As can be seen, the switching circuit is under the control of the central unit 700. More precisely, it is particularly advantageous for the switching circuits to be in local mode while a video telephone call is being set up. This makes it possible to avoid giving one of the parties the possibility of scanning, at will, the premises in which the called video telephone is located by causing its camera to move appropriately once the call has been established.

Further, it is naturally desirable for the switchover from the initial local mode to "cross" mode to take place simultaneously in both of the terminals concerned, and only with the agreement of both parties.

Consequently, each terminal may be provided with a switchover-authorizing key which, when depressed, sends a corresponding signal to the other terminal, preferably by using the same means as described above. Provision may also be made so that the central unit does not cause the associated switching circuit to switchover to cross mode until it has observed that both parties have depressed their corresponding authorization keys.

Further, a terminal with remotely-controllable framing in accordance with the present invention is advantageously applicable to remote surveillance. More precisely, arrangements may be made to enable the user of a local terminal to set up a call unilaterally with a remote terminal and switchover the switching circuits in both terminals to cross mode on his or her own initiative. The security precautions that this type of operation must necessarily include may be provided, for example, by a procedure whereby a secret code is sent to the remote terminal in the form of a string of characters, and by providing the central unit of the remote terminal with means for recognizing the code and for switching over the associated switching circuit when the expected code has been recognized.

A certain number of concrete embodiments of the adjustment means to which the remote control function of the invention is preferably applied are now described. They include remote adjustment of the aiming direction of the camera 200 both in bearing and in elevation.

FIG. 3 shows a portion of a terminal in which the housing is divided into two portions. In this example, the aiming direction is changed by pivoting the portion 120 of the housing containing the camera and its optical system (not shown) about two orthogonal axes.

A hollow shaft 111 which is split in the middle is rigidly mounted on the fixed portion of the housing. A first electric motor and stepdown gear unit 112 is fixed inside the shaft 111 and its outlet shaft 113 carries a gear 114 which meshes with the inside teeth of a toothed ring 115a. This ring is integrally formed with a link element 115. The link element comprises an essentially cylindrical base portion 115b capable of pivoting inside the hollow shaft 111 by virtue of the fact that both of its ends are engaged in the facing openings thereof which delimit the gap in the shaft and which constitute bearings therefor. One of these two ends carries the ring 115a.

In order to ensure continuity in the outside diameter between the hollow shaft 111 and the element 115, the central section 115c of the element 115 has the same outside diameter as the shaft. In addition, this central section includes a second cylindrical portion 115d which extends upwards perpendicularly from the axis of the base portion 115b and which has an internally toothed ring referenced 115e at its end. A sleeve 121 open at its bottom end is fitted over this cylindrical portion 115d in order to pivot thereabout. A second electric motor and stepdown gear unit 122 is fixed inside this sleeve, and its outlet shaft 123 carries a gear 124 which meshes with the internal teeth in the ring 115e. The moving portion 120 of the housing includes a circular opening in its base in which the sleeve 121 is fixed. In this embodiment, the aiming axis of the camera (not shown) is perpendicular to the axes A100 and A200 of the pivots controlled by the motors 112 and 122.

It will be understood that by actuating the first motor 112 in one direction or the other, the portion 121 of the housing is caused to pivot about the horizontal axis A100, thereby varying the elevation angle of the aiming axis of the camera. Further, by actuating the motor 122 in one direction or the other, the same portion 120 of the housing is caused to pivot about the axis A200 as defined by the axis of the cylindrical portion 115d of the link element 115. In this case, the aiming axis is caused to vary sideways in a plane perpendicular to A200, i.e., to a first approximation, in bearing.

FIG. 4 shows how motorization may preferably be applied in two different directions in a terminal whose housing (not shown) is constituted by a single part, and which provides sufficient inside room to house a camera 200 in an essentially horizontal position, i.e. without requiring a mirror or the like.

In this embodiment, the camera 200 is hinged via a bottom lug 201 about a horizontal axis A100 to a vertical riser 1010 capable of pivoting about its own axis A200. At its base, the riser is fixed in a gear 1012 having the same axis A200 and meshing with an endless screw 1014 driven by an appropriate motor and stepdown gear unit 122. Rotation of the motor 122 causes the camera to pivot about the axis A200, thereby adjusting the bearing of its aiming axis AV.

In addition, an arm 1016 is articulated to the riser 1010 about a horizontal axis parallel to A100, and it extends rearwards. The free end thereof carries a nut 1018 having a vertical axis and having an endless screw 1020 engaged therein, said screw being rotatable by a second motor and stepdown gear unit 112. In addition, a link 1022 is articulated at its top end to the rear of the camera and at its bottom end to an intermediate point on the arm 1016. It will be understood that by driving the motor 112 in one direction or the other, the elevation angle of the aiming axis AV of the camera can be caused to vary by displacing the nut 1018 vertically along the endless screw 1020, thereby giving rise to a proportional displacement of the rear end of the camera which pivots about the axis A100.

FIG. 5 shows an embodiment in which the single motor and stepdown gear unit 1100 is provided to vary both the elevation and the bearing of the aiming direction of the camera (not shown in this figure). A hollow shaft 111 houses the motor 1110 which carries a bevel gear 1112 at the end of its outlet shaft. The bevel gear 1112 meshes with another bevel gear 1114 pivotally mounted on a vertical shaft 1116 passing through the top wall of the hollow shaft 111. The gear 1114 also meshes with another bevel gear 1118 situated facing the first bevel gear. The gear 1114 drives an essentially coaxial pulley 1112 via a first electromagnetic clutch/brake 1120. The gear 1118 drives a cylindrical transmission element 1126 via a second electromagnetic clutch/brake 1124, which transmission element 1126 is capable of pivoting inside the hollow shaft 111.

The element 1126 includes a radial housing 1127 pivotally receiving the bottom end of a rod 1128 whose top end is rigidly fixed to the moving portion 120 of the terminal housing, by passing through an intermediate housing portion 120'. Level with the first pulley 1122, this rod is rigidly fixed to a second pulley 1130, and the two pulleys 1122 and 1130 are interconnected by a transmission belt 1132.

Each of the clutch/brake units is designed, under an appropriate electrical control signal, to take up one of two possible states. In a first or clutch state, it transmits the rotation of its inlet shaft to its outlet shaft. In a second, declutched and brake state, the inlet shaft (adjacent to the associated gear) is left free, while the outlet shaft (on the side furthest from the associated gear) is locked.

In a first adjustment mode, the clutch 1120 locks the pulley 1122, and consequently the pulley 1130, so that rotation of the motor 1110 is transmitted via the gears 1112, 1114, and 1118, and the clutch 1124 to transmission element 1126. The portion 120 of the housing can therefore pivot about the axis of rotation A100 of this element, thereby adjusting the elevation of the aiming axis of the camera.

In a second adjustment mode, the states of the two clutch units are interchanged, such that the inclination of the moving portion 120 of the housing about the axis A100 is held fixed by the braking provided by the clutch 1124. Simultaneously, the clutch 1120 transmits motor rotation to the pulley 1122 as received via gears 1122 and 1114. The belt 1132 transmits this rotation to the rod 1128, thereby pivoting the moving portion 120 of the housing about the pivot axis A200 of the rod. This serves essentially to adjust the bearing of the camera aiming axis.

FIGS. 6 and 7 show an embodiment of the invention in which the aiming direction of the camera is modified by acting mechanically only on the camera optics and on the solid state sensor thereof which is securely fixed to the optics. The remainder of the camera, and in particular the electronic circuits associated with the sensor, are fixed and are connected to said sensor by appropriate flexible cabling.

The camera optics is preferably a wide-angle optical system occupying little depth, e.g. made in accordance with the principles described in French patent application, publication number 2 615 009.

As can be seen, the optics 1210 and the sensor 1205 of the camera are rigidly mounted on a plate 1212 extending essentially perpendicularly to the aiming axis. This plate is essentially rectangular in shape and defines three bearing points A1 to A3 disposed at the three vertices of a right angle triangle, whose two short sides are respectively horizontal and vertical.

The first bearing point A1, corresponding to the right angle of the triangle, is connected to a fixed portion of the terminal housing, e.g. to the rear surface of its front wall, via a ball connection 1214 and a rod 1216 whose end opposite to the ball is rigidly fixed to said front wall.

In addition, bearing points A2 and A3 are likewise provided with ball connections, with the connection 1218 of point A3 being visible in FIG. 7. Each ball connection is established between the plate 1212 and a respective rod 1220 and 1222 whose rear end is threaded respectively at 1220a and 122a. These threads are engaged in respective tapped sleeves 1224 and 1226, each of which is fixed to the outlet shaft of a respective motor and stepdown gear unit 1228 and 1230.

By driving the motor unit 1228, the optics-carrying plate 1212 is caused to pivot about the axis A100 passing through bearing points A1 and A2, thereby controlling the elevation of the camera aiming axis AV. Simultaneously, by driving the motor unit 1230, the plate 1212 is caused to pivot about the axis A200 passing through bearing points A1 and A3, thereby controlling the bearing of said aiming axis.

This embodiment of the invention is advantageous in that only a small and lightweight portion of the terminal is designed to be moved. It is therefore possible to use miniature an cheap electrical motor and transmission means.

Finally, FIG. 8 shows a variant embodiment in which the aiming axis of the camera (not shown) is adjustable not in elevation and in bearing as described above, but in height and in bearing.

To this end, the housing of the terminal includes a fixed portion 110 resting on a plane support, and a displaceable portion 120.

A first motor and stepdown gear unit 122 is disposed in the fixed portion and serves to rotate an endless screw 1310 which in turn engages a vertical axis gear 1312. This gear is rigidly mounted to the bottom end of a rod 1314 which projects upwards from the bottom portion 110 of the housing. The top portion 120 is mounted on said rod by means of a complementary vertical sleeve 1316 in order to slide vertically up and down the rod, but without rotating thereabout. In addition, a rack 1318 is provided on one of the side faces of the rod 1314. A horizontal axis pinion 1320 is mounted in the portion 120 of the housing in the vicinity of the rod 1314 and meshes with the rack 1318. The pinion 1320 may be rotated selectively by an appropriate motor and stepdown gear unit 112 which is also housed in the portion 120 of the housing.

When the motor 122 is caused to rotate, the bearing of the camera aiming direction is adjusted by pivoting the portion 120 of the housing which is rigidly fixed to said camera about the axis A200 of the rod 1314 and of its gear 1312.

When the motor 112 is rotated, then the height of the portion 120 of the housing is changed, thereby raising or lowering the aiming axis until the subject is properly framed.

The rod 1314 is preferably hollow and serves to convey various connection cables between the two portions 110 and 120 of the housing.

Naturally, in all of the practical embodiments described above, the various motions driven by the, or each, motor are limited by conventional means well known to the person skilled in the art, and in particular by end-of-stroke microswitches or by a servo system including position encoding means.

Further, although the above description relates specifically only to means for varying the direction or the height of the camera aiming direction, the present invention naturally extends, as mentioned above, to adjusting any parameter relating to the operation of a video telephone type terminal, so long as the parameter is capable of being varied and adjusted under the control of appropriate electrical signals.

For example, in addition to remotely controlling framing by means such as those described above, the invention may also be used for adjusting the following parameters:

focal length of the camera lens (zoom), thereby enabling the local or the remote party to narrow the field of view in order to obtain a close-up type of shot, or on the contrary to widen the field of view;

camera color adjustments, thereby making it possible, for example, to compensate for possible color temperature differences that may appear, e.g. as night falls, etc.;

lens aperture number, thereby enabling a party to adjust camera operation to particular conditions, e.g. back-lighting; and audio volume and tone, if the sound level at the remote terminal falls off, the other party can act on the gain of the remote microphone amplifier, in particular for the purpose of retaining an acceptable signal/noise ratio, and it is also possible for the spectrum response of the audio circuit to be modified in order to cope with poor intelligibility.

Further, it is possible for a single terminal to combine motorized adjustments capable of being remotely controlled from a remote terminal with manual adjustments that are directly accessible to the local user. Thus, for example, when adjusting the aiming direction of the camera, the aiming direction can be grossly adjusted by manual displacement after which the motors can be used for fine adjustment. In this case, in order to prevent manual movements damaging the motors or their transmission systems, said transmission systems may include torque limiters or friction couplings. Such mechanisms may also be used to avoid such damage occurring when such manual adjustment is not intended but when the terminal is subjected to accidental shock.

Further, the means for limiting camera displacement may be constituted by end-of-stroke switches connected to the motor(s) in order to reverse the direction of rotation as soon as the corresponding framing limit has been reached. This makes it possible for a party to perform horizontal and vertical oscillating scanning at a local terminal or at a remote terminal merely by depressing a single button reserved for this purpose.

Finally, the present invention is not limited to the various embodiments described above and shown in the drawings, but extends to any variant that may occur to the person skilled in the art.

Mention may also be made of a particular advantage of the present invention when video telephones are used in a video conference, i.e. when a plurality of parties are communicating with a remote video telephone by means of a single local video telephone. In this case, since it is possible to remotely adjust the aiming direction and zoom of the camera, the remote user can concentrate the image on a selected party e.g. the party actually speaking.

Finally, although the above description is limited to adjusting the aiming direction of a camera by displacing the camera (or its optical system) and/or the housing, it should naturally be understood that the invention also applies to adjusting the aiming direction merely by displacing a mirror such as the mirror 220 of FIG. 1.

We claim:

1. An audio and video communications terminal, of the type comprising a housing, a camera including an optical system, a display screen, a microphone, a loudspeaker, and a central unit including sound and image information encoding means and sound and image information decoding means, and interface means in association with said elements for communicating with another terminal of the same type via a digital transmission network, said screen being normally used for displaying image information received from said other terminal, wherein the terminal further comprises, in combination:

adjustment means for adjusting at least one camera parameter;

manual control means suitable for generating control information for adjusting said parameter(s); and control and image information switching means for switching over between:

(i) a temporary local adjustment mode in which said control information is applied to said adjustment means and signals from the camera are applied to the screen instead of image information received from the other terminal, thereby enabling a speaker to adjust said parameter(s) according to what he sees on the screen; and (ii) a remote adjustment mode in which said control information is sent to said other terminal over the digital network in parallel with said sound and image information, and in which control information received from said other terminal, likewise over the digital network and in parallel with sound and image information, is applied to said adjustment means and said image information received from said other terminal is applied to the screen;

said terminal further comprising a light source for illuminating the subject, and wherein the adjustment means are suitable for acting on the intensity of the source which thus constitutes one of the camera parameters.

2. An audio and video communications terminal, of the type comprising a housing, a camera inluding an optical system, a display screen, a microphone, a loudspeaker, and a central unit including sound and image information encoding means and sound and image information decoding means, and interface means in association with said elements for communicating with another terminal of the same type via a digital transmission network, said screen being normally used for displaying image information received from said other terminal, wherein the terminal further comprises, in combination:

adjustment means for adjusting at least one camera parameter;

manual control means suitable for generating control information for adjusting said parameter(s); and control and image information switching means for switching over between:

(i) a temporary local adjustment mode in which said control information is applied to said adjustment means and signals from the camera are applied to the screen instead of image information received from the other terminal, thereby enabling a speaker to adjust said parameter(s) according to what he sees on the screen; and (ii) a remote adjustment mode in which said control information is sent to said other terminal over the digital network in parallel with said sound and image information, and in which control information received from said other terminal, likewise over the digital network and in parallel with sound and image information, is applied to said adjustment means and said image information received from said other terminal is applied to the screen;

wherein said adjustment means are also suitable for acting on sound transmission parameters to obtain a signal to noise ratio.

3. An audio and video communications terminal, of the type comprising a housing, a camera including an optical system, a display screen, a microphone, a loudspeaker, and a central unit including sound and image information encoding means and sound and image information decoding means, and interface means in association with said elements for communicating with another terminal of the same type via a digital transmission network, said screen being normally used for displaying image information received from said other terminal, wherein the terminal further comprises, in combination:

adjustment means for adjusting at least one camera parameter;

manual control means suitable for generating control information for adjusting said parameter(s); and control and image information switching means for switching over between:

a temporary local adjustment mode in which said control information is applied to said adjustment means and signals from the camera are applied to the screen instead of image information received from the other terminal, thereby enabling a speaker to adjust said parameter(s) according to what he sees on the screen;

a remote adjustment mode in which said control information is sent to said other terminal over the digital network in parallel with said sound and image information, and in which control information received from said other terminal, likewise over the digital network and in parallel with sound and image information, is applied to said adjustment means and said image information received from said other terminal is applied to the screen, wherein in the remote adjustment mode, adjustment information is conveyed over the digital network in the form of digital words incorporated in predetermined time intervals in the "control and flag" section of a standard digital transmission frame.

4. An audio and video communications terminal, of the type comprising a housing, a camera including an optical system, a display screen, a microphone, a loudspeaker, and a central unit including sound and image information encoding means and sound and image information decoding means, and interface means in association with said elements for communicating with another terminal of the same type via a digital transmission network, said screen being normally used for displaying image information received from said other terminal, wherein the terminal further comprises, in combination:

adjustment means for adjusting at least one camera parameter;

manual control means suitable for generating control information for adjusting said parameter(s); and control and image information switching means for switching over between:

a temporary local adjustment mode in which said control information is applied to said adjustment means and signals from the camera are applied to the screen instead of image information received from the other terminal, thereby enabling a speaker to adjust said parameter(s) according to what he sees on the screen;

a remote adjustment mode in which said control information is sent to said other terminal over the digital network in parallel with said sound and image information, and in which control information received from said other terminal, likewise over the digital network and in parallel with sound and image information, is applied to said adjustment means and said image information received from said other terminal is applied to the screen; and said adjustment means including motorized drive means for changing the aiming direction of the camera; and said motorized drive means acting on a mirror associated with the optical system of the camera.

5. An audio and video communications terminal, of the type comprising a housing, a camera including an optical system, a display screen, a microphone, a loudspeaker, and a central unit including sound and image information encoding means and sound and image information decoding means, and interface means in association with said elements for communicating with another terminal of the same type via a digital transmission network, said screen being normally used for displaying image information received from said other terminal, wherein the terminal further comprises, in combination:

adjustment means for adjusting at least one camera parameter;

manual control means suitable for generating control information for adjusting said parameter(s); and control and image information switching means for switching over between:

a temporary local adjustment mode in which said control information is applied to said adjustment means and signals from the camera are applied to the screen instead of image information received from the other terminal, thereby enabling a speaker to adjust said parameter(s) according to what he sees on the screen;

a remote adjustment mode in which said control information is sent to said other terminal over the digital network in parallel with said sound and image information, and in which control information received from said other terminal, likewise over the digital network and in parallel with sound and image information, is applied to said adjustment means and said image information received from said other terminal is applied to the screen;

wherein the switching means are in local mode while a call is being set up;

wherein the switchovers of the switching means from one mode to the other are controlled by the central unit;

said terminal further comprising means for generating an authorization signal for authorizing switchover to remote mode, and the central unit includes means for switching over the switching means to remote mode only after such authorization has been both generated in the terminal itself and received from another terminal.

6. A terminal according to claim 5, wherein the central unit includes means for recognizing a code received from another terminal and for switching over said switching means to remote mode when said received code is recognized.

7. An audio and video communications terminal, of the type comprising a housing, a camera including an optical system, a display screen, a microphone, a loudspeaker, and a central unit including sound and image information encoding means and sound and image information decoding means, and interface means in association with said elements for communicating with another terminal of the same type via a digital transmission network, said screen being normally used for displaying image information received from said other terminal, wherein the terminal further comprises, in combination:
 adjustment means for adjusting at least one camera parameter;
 manual control means suitable for generating control information for adjusting said parameter(s); and
 control and image information switching means for switching over between:
 a temporary local adjustment mode in which said control information is applied to said adjustment means and signals from the camera are applied to the screen instead of image information received from the other terminal, thereby enabling a speaker to adjust said parameter(s) according to what he sees on the screen;
 a remote adjustment mode in which said control information is sent to said other terminal over the digital network in parallel with said sound and image information, and in which control information received from said other terminal, likewise over the digital network and in parallel with sound and image information, is applied to said adjustment means and said image information received from said other terminal is applied to the screen;
 said adjustment means including motorized drive means for changing the aiming direction of the camera;
 said drive means adapted to vary the elevation and the bearing of the camera aiming direction; and
 said housing comprising a fixed portion and a moving portion housing the camera and hinged to the fixed portion about a horizontal axis, said drive means acting on the portion of the housing which houses the camera.

8. A terminal according to claim 7, wherein the drive means are likewise suitable for pivoting said portion of the housing which houses the camera about an axis which is perpendicular simultaneously to the hinge axis and to the aiming axis of the camera.

9. An audio and video communications terminal, of the type comprising a housing, a camera including an optical system, a display screen, a microphone, a loudspeaker, and a central unit including sound and image information encoding means and sound and image information decoding means, and interface means in association with said elements for communicating with another terminal of the same type via a digital transmission network, said screen being normally used for displaying image information received from said other terminal, wherein the terminal further comprises, in combination:
 adjustment means for adjusting at least one camera parameter;
 manual control means suitable for generating control information for adjusting said parameter(s); and
 control and image information switching means for switching over between:
 a temporary local adjustment mode in which said control information is applied to said adjustment means and signals from the camera are applied to the screen instead of image information received from the other terminal, thereby enabling a speaker to adjust said parameter(s) according to what he sees on the screen;
 a remote adjustment mode in which said control information is sent to said other terminal over the digital network in parallel with said sound and image information, and in which control information received from said other terminal, likewise over the digital network and in parallel with sound and image information, is applied to said adjustment means and said image information received from said other terminal is applied to the screen;
 said adjustment means including motorized drive means for changing the aiming direction of the camera; and
 said drive means adapted to vary the height of the camera and the bearing direction of its aiming axis.

10. An audio and video communications terminal, of the type comprising a housing, a camera including an optical system, a display screen, a microphone, a loudspeaker, and a central unit including sound and image information encoding means and sound and image information decoding means, and interface means in association with said elements for communicating with another terminal of the same type via a digital transmission network, said screen being normally used for displaying image information received from said other terminal, wherein the terminal further comprises, in combination:
 adjustment means for adjusting at least one camera parameter;
 manual control means suitable for generating control information for adjusting said parameter(s); and
 control and image information switching means for switching over between:
 a temporary local adjustment mode in which said control information is applied to said adjustment means and signals from the camera are applied to the screen instead of image information received from the other terminal, thereby enabling a speaker to adjust said parameter(s) according to what he sees on the screen;
 a remote adjustment mode in which said control information is sent to said other terminal over the digital network in parallel with said sound and image information, and in which control information received from said other terminal, likewise over the digital network and in parallel with sound and image information, is applied to said adjustment means and said image information received from said other terminal is applied to the screen;
 said adjustment means including motorized drive means for changing the aiming direction of the camera;
 said drive means adapted to vary the elevation and the bearing of the camera aiming direction;

said drive means comprising a single electric motor and two clutches connected to the motor.

11. An audio and video communications terminal, of the type comprising a housing, a camera including an optical system, a display screen, a microphone, a loudspeaker, and a central unit including sound and image information encoding means and sound and image information decoding means, and interface means in association with said elements for communicating with another terminal of the same type via a digital transmission network, said screen being normally used for displaying image information received from said other terminal, wherein the terminal further comprises, in combination:

adjustment means for adjusting at least one camera parameter;

manual control means suitable for generating control information for adjusting said parameter(s); and control and image information switching means for switching over between:

a temporary local adjustment mode in which said control information is applied to said adjustment means and signals from the camera are applied to the screen instead of image information received from the other terminal, thereby enabling a speaker to adjust said parameter(s) according to what he sees on the screen;

a remote adjustment mode in which said control information is sent to said other terminal over the digital network in parallel with said sound and image information, and in which control information received from said other terminal, likewise over the digital network and in parallel with sound and image information, is applied to said adjustment means and said image information received from said other terminal is applied to the screen;

said adjustment means including motorized drive means for changing the aiming direction of the camera;

said drive means adapted to vary the elevation and the bearing of the camera aiming direction;

said drive means comprising a support for the camera optics, the support including three bearing points disposed in a right angle triangle, the point situated at the right angle of the triangle being constituted by a ball link, and motorized means for varying the positions of the other two bearing points in directions essentially perpendicular to the plane of the triangle.

* * * * *

UNITED STATES PATENT AND TRADEMARK OFFICE
CERTIFICATE OF CORRECTION

PATENT NO. : 5,170,427
DATED : December 8, 1992
INVENTOR(S) : Guichard et al.

It is certified that error appears in the above-identified patent and that said Letters Patent is hereby corrected as shown below:

On the title page:

[73] Assignee   after "Etat Francais" insert --représénté par le Ministre des Posts, Télécommunications et de l'Espace (Centre National d'Etudesdes Télécommunications)

Signed and Sealed this

Fifth Day of September, 1995

Attest:

BRUCE LEHMAN

*Attesting Officer*   *Commissioner of Patents and Trademarks*